United States Patent
Steinmetz et al.

(10) Patent No.: US 6,660,800 B1
(45) Date of Patent: Dec. 9, 2003

(54) PROCESS FOR MAKING CROSSLINKED POLYVINYLPYRROLIDONE

(75) Inventors: Beth M. Steinmetz, Bryn Mawr, PA (US); Manish K. Nandi, Malvern, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 66 days.

(21) Appl. No.: 10/272,729

(22) Filed: Oct. 17, 2002

(51) Int. Cl.[7] .............................................. C08L 55/00
(52) U.S. Cl. ..................... 524/555; 524/827; 526/173; 526/264
(58) Field of Search ................................ 526/173, 264; 524/555, 827

(56) References Cited

U.S. PATENT DOCUMENTS

| | | | |
|---|---|---|---|
| 4,795,802 A | 1/1989 | Nuber et al. | 528/482 |
| 5,239,053 A | 8/1993 | Tseng et al. | 528/483 |
| 5,393,854 A * | 2/1995 | Tseng et al. | 526/264 |
| 6,512,066 B1 * | 1/2003 | Steinmetz et al. | 526/264 |
| 2002/0022699 A1 * | 2/2002 | Kuriyama et al. | 525/326.9 |

FOREIGN PATENT DOCUMENTS

WO    WO 94/20555    9/1994

* cited by examiner

*Primary Examiner*—Helen L. Pezzuto

(57) ABSTRACT

A process for making crosslinked polyvinylpyrrolidone (PVP-P) is disclosed. Crosslinker generation, followed by polymerization of NVP, gives a polymer containing up to 4 wt. % of residual NVP. An aqueous mixture of the polymer is then heated in the presence of a protic acid at pH<4 to eliminate NVP. Finally, the PVP-P is neutralized with aqueous alkali metal hydroxide. The process generates a reduced volume of low-toxicity aqueous waste (<20 L/kg PVP-P) and gives PVP-P that meets important product specifications.

14 Claims, No Drawings

PROCESS FOR MAKING CROSSLINKED POLYVINYLPYRROLIDONE

FIELD OF THE INVENTION

The invention relates to a process for making crosslinked polyvinylpyrrolidone. In particular, the invention is a process for reducing the toxicity and volume of aqueous waste generated in a base-catalyzed process for making the polymer.

BACKGROUND OF THE INVENTION

Polyvinylpyrrolidones have diverse utility. They are used in polymer films, adhesives, hair and skin-care formulations, pharmaceutical tablet binders and disintegrants, and beverage clarifiers. Polyvinylpyrrolidones are normally produced by free-radical or base-catalyzed polymerization of N-vinylpyrrolidone (NVP).

Free-radical initiators, such as hydrogen peroxide or organic peroxides, polymerize NVP to give polymers having relatively low molecular weight and a low degree of crosslinking. These products (e.g., "PVP K30" and "PVP K90") are soluble in water and alcohols, and they can be purified by treating their solutions with adsorbants or ion-exchange resins (see, e.g., U.S. Pat. No. 4,795,802).

In contrast, crosslinked polyvinylpyrrolidone ("crosslinked PVP" or "PVP-P") has a high molecular weight and a high degree of crosslinking. It is produced by base-catalyzed polymerization of NVP. Crosslinked PVP is usually produced by one of two general methods. In one approach, NVP is polymerized in the presence of an added difunctional crosslinker. In another approach, the crosslinker is generated "in situ" in a two-stage process. In the first stage, an aqueous mixture containing N-vinylpyrrolidone (NVP) and about 0.4 to 0.8 wt. %, based on the amount of NVP, of an alkali metal hydroxide (usually NaOH) is heated to about 140° C. to generate divinyl crosslinkers. After several hours, the mixture is cooled to about 100° C., and polymerization begins.

Crosslinked PVP is not soluble in water or alcohols. Therefore, impurities cannot be removed by forming a solution and treating it with, for example, an ion-exchange resin or activated carbon. Instead, a typical workup for PVP-P starts with extensive water washing to remove residual alkali metal hydroxide residues. Usually, the polymer is washed until the pH of the washings is close to 7. This is followed by washing with aqueous acid to neutralize base and convert residual NVP to the less-toxic 2-pyrrolidone. A final water wash is then used to remove traces of acid from the PVP-P.

A large volume of water is needed in the three steps to purify the polymer, so a lot of wastewater is generated. Consequently, a PVP-P manufacturer has high disposal costs. Moreover, because the waste-water from the initial washing step normally contains a high concentration (100–1000 ppm) of NVP, the manufacturer must find an environmentally acceptable way to dispose of this relatively toxic waste stream.

U.S. Pat. No. 5,239,053 teaches a process for purifying vinyl lactam polymers, including crosslinked and linear (uncrosslinked) PVP. The reference does not deal with issues of waste volume or toxicity. Residual NVP is eliminated by treatment with an acid or carbon dioxide. In the examples that show how to treat crosslinked PVP (see Examples 1, 9, 10, and 12), the polymer samples are first washed several times with water and are then "reconstituted" with water to give an aqueous mixture having an approximately neutral pH. These washing steps, which are performed prior to any acid or carbon dioxide treatment, generate an aqueous waste stream that contains a substantial amount of NVP. Ideally, such a waste stream would be avoided.

One way to avoid using large volumes of water is to simply reduce the amount of water in the aqueous wash solutions. Another possible solution is to skip water washing and use only aqueous acid (to remove NVP) followed by aqueous NaOH (to neutralize acid). Unfortunately, these approaches usually give PVP-P that does not meet at least one of the important product specifications. Crosslinked PVP used in beverage clarification, for example, requires a neutral polymer having residual NVP<5 ppm and residual Na<250 ppm.

In sum, the industry would benefit from improved ways of making crosslinked PVP. In particular, a process for making PVP-P that generates a reduced amount of aqueous waste is desirable. A process that produces aqueous waste streams that contain little or no N-vinylpyrrolidone is especially needed. Ideally, the process would give crosslinked PVP that meets or exceeds important product specifications.

SUMMARY OF THE INVENTION

The invention is a four-step process for making crosslinked PVP. First, an aqueous mixture that contains N-vinylpyrrolidone and an alkali metal hydroxide is heated in a sealed reactor under added pressure to generate a crosslinker. The reactor temperature is then reduced to initiate polymerization and produce a mixture that contains crosslinked polyvinylpyrrolidone (PVP-P) and residual N-vinylpyrrolidone. Water is added, and the resulting aqueous PVP-P mixture is heated in the presence of a protic acid at pH<4 to eliminate NVP. Finally, the PVP-P is neutralized with aqueous alkali metal hydroxide.

By using the process described above, we reduced the volume of aqueous waste generated to less than about 20 L/kg of PVP-P produced. Moreover, the purified PVP-P has residual NVP less than 5 ppm and residual alkali metal content less than 250 ppm. Importantly, none of the aqueous waste generated has a residual NVP concentration greater than about 10 ppm.

DETAILED DESCRIPTION OF THE INVENTION

The process of the invention gives high-quality crosslinked polyvinylpyrrolidone (PVP-P) in four steps while generating a reduced quantity of aqueous waste having relatively low toxicity.

In step one, a crosslinker is generated in situ. An aqueous mixture that contains from about 70 to about 90 wt. %, preferably from about 75 to about 85 wt. %, of N-vinylpyrrolidone (NVP) is heated in the presence of an alkali metal hydroxide. Suitable alkali metal hydroxides include sodium hydroxide, potassium hydroxide, lithium hydroxide, and the like. Sodium hydroxide is particularly preferred. The amount of alkali metal hydroxide used in this step is preferably less than about 1.0 mole %, more preferably less than about 0.7 mole %, based on the amount of N-vinylpyrrolidone used. This amount is relatively low compared with the amount generally used, which is typically 1.5 to 2.5 mole %. For example, a typical amount of sodium hydroxide used in the industry is about 0.6 wt. % (about 2 mole %).

The ability to use a low concentration of alkali metal hydroxide in step one is an advantage of the invention because it facilitates the preparation of PVP-P that meets product specifications for residual NVP and residual alkali metal content. There is a "domino effect" here: the less alkali metal hydroxide used in step one, the less acid needed for step three, and consequently, the less base needed for neutralization step 4, and the less residual alkali metal in the PVP-P.

The aqueous NVP and alkali metal hydroxide are heated at a temperature within the range of about 130° C. to about 150° C. to generate the crosslinker. A more preferred range is from about 135° C. to about 145° C.; most preferred is about 140° C. As discussed above, the idea of generating a crosslinker in situ prior to polymerization of NVP is well known, but it is normally generated at higher base concentrations.

Step one is performed under added pressure, preferably at least about 40 psig, more preferably at least about 50 psig. This is conveniently done by sealing the reaction vessel (ideally an autoclave reactor or the like) and pressurizing to at least about 40 psig prior to heating. A similar approach is described in WO 94/20555, which teaches that elevating the initial reactor pressure to at least 2 bars (about 29 psig) reduces the "induction time," i.e., the amount of time needed for polymerization to begin once the temperature is dropped to about 100° C.

Most of the NVP polymerizes in step two. The reaction mixture from step one is simply cooled (or allowed to cool) to a temperature within the range of about 95° C. to about 105° C., preferably from about 98° C. to about 102° C., to initiate "popcorn" polymerization (see, e.g. WO 94/20555). As suggested in the previous paragraph, an induction time precedes the onset of polymerization. Once polymerization begins, an exotherm is normally observed. The polymerization is usually complete within about 5 hours. The product from step two is crosslinked polyvinylpyrrolidone that contains up to about 4.0 wt. % (40,000 ppm) of residual NVP.

Step three involves acid treatment of the PVP-P. First, water is added to the crosslinked PVP product. The amount of water used is an amount needed to give an easily stirred aqueous suspension. Typically, an amount within the range of about 4 to about 12 liters of water per kilogram of PVP-P, preferably from about 6 to about 10 L/kg, will suffice. The aqueous PVP-P mixture is heated to a temperature within the range of about 80° C. to about 100° C., more preferably from about 85° C. to about 95° C., most preferably to about 90° C. A protic acid is added, preferably a little at a time, until the pH of the mixture is less than about 4.

Suitable protic acids include acetic acid, formic acid, propionic acid, hydrochloric acid, phosphoric acid, sulfuric acid, and the like. Formic acid and acetic acid are particularly preferred.

Using enough protic acid to reach a pH less than about 4 is important for reducing the residual NVP to an ultimate target specification of less than 5 ppm. We found that residual NVP in the polymer is too high if the pH is reduced to a value greater than 4 (see Comparative Examples 4 and 5).

Heating to at least about 80° C. during acid treatment is also important for reducing residual NVP to acceptable levels. Treatment with acetic or formic acid at 90° C. provides PVP-P having residual NVP<5 ppm. In contrast, we found that either room temperature acid treatment (Comparative Example 6) or acid treatment at 70° C. (Comparative Example 7) is ineffective in eliminating NVP.

In step four, the PVP-P is neutralized with aqueous alkali metal hydroxide. Neutralization can be accomplished by any suitable method. In one convenient approach, the aqueous, acidic PVP-P mixture from step three is filtered to isolate the solids, the solids are slurried in water, and aqueous alkali metal hydroxide solution is added until the pH reaches a targeted value. Preferably, enough alkali metal hydroxide is added to raise the mixture pH to greater than 5, more preferably to a pH within the range of about 5.5 to 6.0. The amount of alkali metal hydroxide used in step four should be minimized to help in keeping the alkali metal content of the final PVP-P within specifications. The neutralized product is isolated, preferably by filtration, and is usually dried under vacuum. Example 1 illustrates this neutralization approach.

In another convenient neutralization method, the aqueous, acidic PVP-P mixture is not filtered. Instead, the aqueous alkali metal hydroxide is added directly to the acidic mixture ("direct neutralization") until the pH reaches the targeted value, which is again preferably greater than 5, and more preferably within the range of about 5.5 to 6.0. When direct neutralization is used, it is usually necessary to wash the PVP-P with water to remove alkali metal hydroxide residues.

As shown in Example 10, direct neutralization, followed by filtration and water washing gives a PVP-P product that meets the target specification (<250 ppm) for sodium content. In contrast, when the water washing step is omitted, the PVP-P usually contains too much alkali metal (see Comparative Examples 11–13; residual Na=1200, 730, or 1600 ppm).

The process of the invention generates a reduced amount of aqueous waste compared with conventional processes, which normally utilize multiple water washes prior to any acid treatment or neutralization steps. In particular, the process of the invention generates less than or equal to about 20 liters of wastewater per kilogram of PVP-P produced, and preferably less than 15 L/kg.

Importantly, the process generates an overall aqueous waste stream having low toxicity. Conventional approaches start with multiple water washes and produce a waste stream having 100–1000 ppm of NVP (see, e.g., Example 1 from U.S. Pat. No. 5,239,053 and Comparative Examples A and 3, below). In contrast, the process of the invention starts with acid treatment to convert NVP to less-toxic hydrolysis products, so none of the aqueous waste streams contains more than about 10 ppm, usually not more than about 5 ppm, of residual NVP.

Finally, the process of the invention affords crosslinked polyvinylpyrrolidone that meets important product specifications. In particular, the residual NVP in the polymer is less than 5 ppm, preferably less than 1 ppm. The residual alkali metal content is less than 250 ppm, preferably less than 100 ppm. With conventional methods, it is difficult to produce on-spec PVP-P while generating a reduced volume of low-toxicity aqueous waste.

The following examples merely illustrate the invention. Those skilled in the art will recognize many variations that are within the spirit of the invention and scope of the claims.

Comparative Example A

Effect of Water Washing on Residual NVP

A 15-g sample of crosslinked PVP containing 0.775 wt. % of residual N-vinylpyrrolidone (by HPLC) is washed successively with three 190-mL portions of distilled water. The first wash contains 552.7 ppm of NVP (0.568 g/L); the second wash contains 205.4 ppm NVP (0.028 g/L), and the third wash contains 94.5 ppm NVP (0.0088 g/L).

Sample calculation: The initial sample contains 15 g×0.775 wt. %=0.11625 g of NVP. After one 190-mL wash, we have 15 g×0.05527 wt. %=0.0083 g NVP. The difference (0.11625−0.0083 g=0.10795 g) is in the water. The amount of NVP in this first wash is 0.10795 g/0.190 L=0.568 g NVP per liter of water.

Translating this into terms of a 1-kg sample of PVP-P to be purified, the first wash would use (190 mL×1000/15)= 12.67 liters of water. The initial 1-kg sample would contain 0.775 wt. %=7.75 g of NVP. After one wash, the sample would contain 1000 g×0.5527 wt. %=0.553 g of NVP. The difference (7.75−0.553=7.20 g) is the amount of NVP that would be present in the initial 12.67 L wash. After three washes, a total of 38 L of water would be used, and the third wash would still contain 95 ppm of NVP.

The results demonstrate that water washing alone is ineffective in removing enough of the NVP, so a large volume of waste is produced. More importantly, water washing before any acid treatment generates a waste stream having an undesirably high concentration of NVP.

EXAMPLE 1

Low Initial Base Concentration, "High" Initial Pressure

A two-gallon autoclave reactor is charged with N-vinylpyrrolidone (1105 g), distilled water (195 g), and sodium hydroxide (2.21 g NaOH, added in the form of a 20 wt. % aqueous solution, 0.20 wt. % based on the amount of NVP). The reactor is purged with nitrogen, sealed, and pressurized to 51 psig. The mixture is stirred, and the temperature is raised to 140° C. The mixture is held at 140° C. for 5 h. The contents are then cooled to 100° C., and this temperature is maintained until an exotherm (to 134° C.) is noted (after about 18 minutes at 100° C.). The reaction mixture is allowed to cool to room temperature. Residual NVP in the polymer (as measured by HPLC analysis of a water or methanol extract) is 3.5 wt. %.

Distilled water (2.9 gal, 11 L) is added to the reactor. The slurry is then removed to an open vessel, where it is heated to 90° C. Glacial acetic acid (19.8 g) is added to the slurry, with stirring, until the pH is less than 4. Stirring continues for 3 h at 90° C. The vessel contents are vacuum filtered. Residual NVP in the polymer is 5.8 ppm. This initial aqueous phase contains less than 10 ppm of NVP.

The solid PVP-P is slurried in a second 11-L portion of distilled water. Aqueous sodium hydroxide solution (9.9 g of 20 wt. % NaOH) is added until the mixture pH reaches 5.5. The vessel contents are vacuum filtered and then dried for 12 h under vacuum at 70° C. Residual NVP in the polymer is 1.7 ppm. Residual sodium: 140 ppm. The pH of a 10 wt. % slurry of the dried PVP-P is 5.8. Swell volume: 60 g/10 g polymer. Total aqueous waste: 5.8 gal (20 L/kg of PVP-P). The product meets specifications for acidity, residual NVP (<5 ppm), and residual sodium (<250 ppm).

EXAMPLE 2

The procedure of Example 1 is repeated, except that the PVP-P product is heated with glacial acetic acid for 2 hours instead of 3 hours. Residual NVP in the polymer following neutralization with aq. NaOH is 1.5 ppm.

Comparative Example 3

Conventional Wash Procedure

A two-gallon autoclave reactor is charged with N-vinylpyrrolidone (1076 g), distilled water (236 g), and sodium hydroxide (5.38 g NaOH, added in the form of a 20 wt. % aqueous solution, 0.57 wt. % based on the amount of NVP). The reactor is purged with nitrogen, sealed, and pressurized to 35 psig. The mixture is stirred, and the temperature is raised to 140° C. The mixture is held at 140° C. for 3 h. The contents are then cooled to 100° C., and this temperature is maintained until an exotherm is noted. The reaction mixture is allowed to cool to room temperature. Residual NVP in the polymer is 0.90 wt. %.

Distilled water (2.0 gal, 7.6 L) is added to the reactor. The contents are stirred, then removed and vacuum filtered. (This first aqueous wash contains about 260 ppm of NVP.) The PVP-P is then washed with 0.1 wt. % $H_3PO_4$ solution (4.0 gal, 15 L), followed by distilled water (4.0 gal, 15 L). After drying the polymer, residual NVP is 3 ppm. Total aqueous waste: 10 gal (35 L/kg).

This example demonstrates that the conventional way of washing PVP-P (involving an initial water wash and no heat treatment with acid) generates a large volume of aqueous waste, including at least one stream that contains a high concentration of NVP.

Comparative Example 4

Higher pH During Acid Treatment

The procedure of Example 1 is generally followed, except that enough glacial acetic acid is added to reduce the mixture pH to <5 rather than <4. After 3 h at 90° C., the slurry is filtered. Residual NVP is 1449 ppm. The product is combined with distilled water (2.8 gal, 11 L) and 20% aq. NaOH (1.02 g) is added until the pH reaches 5.5. The contents are vacuum filtered and dried as previously described. Residual NVP: 275 ppm. Total aqueous waste: 5.8 gal (20 L/kg). This example demonstrates the need to reduce pH to <4 for adequate NVP removal.

Comparative Example 5

Higher pH During Acid Treatment

Crosslinked PVP is prepared using the procedure of Comparative Example 3. After polymerization, the residual NVP in the polymer is 0.78 wt. %. The polymer (about 1300 g) is slurried in distilled water (2.8 gal, 11 L), and the mixture is heated to 90° C. Glacial acetic acid is added to pH<5, heating continues for 3 h at 90° C., and the slurry is then filtered. Residual NVP: 77 ppm.

This example shows that pH<4 is needed to reduce the NVP content of the polymer to acceptable levels.

Comparative Example 6

Room Temperature Acid Treatment

Crosslinked PVP is prepared using the procedure of Comparative Example 3. After polymerization, the residual NVP in the polymer is 0.78 wt. %. The polymer is slurried in distilled water (2.8 gal, 11 L). Glacial acetic acid is added to the slurry until the mixture pH is <4. The mixture is stirred for 3 h at room temperature, then filtered. Residual NVP: 2413 ppm. The product is washed with distilled water (1.5 gal, 5.7 L), followed by more water (2.0 gal, 7.6 L), and is then dried under vacuum. Residual NVP: 202 ppm. Total aqueous waste: 6.3 gal (22 L/kg).

This example demonstrates the need to perform the acid treatment at elevated temperature to remove NVP adequately.

Comparative Example 7

Reduced Temperature Acid Treatment

Crosslinked PVP-P is prepared as in Comparative Example 3. The polymer contains 1.0 wt. % of residual NVP. The polymer is slurried in distilled water (2.8 gal, 11 L), and the mixture is heated to 70° C. Glacial acetic acid is added to pH<4, and heating continues at 70° C. for 3 h. The slurry is then filtered, and the polymer is combined with distilled water (2.8 gal, 11 L). Aqueous sodium hydroxide solution (0.9 g of 20% aq. NaOH) is added to raise the mixture pH to 5.6. The product is vacuum filtered and dried as previously described. Residual NVP: 73 ppm. Total aqueous waste: 5.6 gal (20 L/kg).

This example shows that an acid treatment temperature greater than 70° C. is needed to reduce the NVP content of the polymer to acceptable levels.

Table 1 summarizes the results from Examples 1–2 and Comparative Examples 3–7.

EXAMPLE 8

Formic Acid, "High" Initial Base Concentration

Crosslinked PVP is prepared as in Comparative Example 3. Residual NVP in the polymer is 0.90 wt. %. The polymer is slurried in distilled water (2.8 gal, 11 L), and the mixture is heated to 90° C. Formic acid (about 1.8 g) is added to pH<4, and heating continues for 3 h. The slurry is filtered, and the polymer is combined with distilled water (2.8 gal, 11 L). Aqueous sodium hydroxide solution (0.2 g of 20% aq. NaOH) is added to raise the mixture pH to 5.6. The product is vacuum filtered and dried as previously described. Residual NVP: 1.2 ppm; residual Na: 89 ppm. Total aqueous waste: 5.6 gal (20 L/kg).

This example shows that a relatively high initial concentration of sodium hydroxide (0.57 wt. %) and relatively low initial pressure (35 psig) can be used for the polymerization when formic acid is used.

Comparative Example 9

Acetic Acid, "High" Initial Base Concentration

Crosslinked PVP is prepared as in Comparative Example 3. Residual NVP in the polymer is 0.78 wt. %. The polymer is slurried in distilled water (2.8 gal, 11 L), and the mixture is heated to 90° C. Glacial acetic acid (41.8 g) is added to pH<4, and heating continues for 3 h. The slurry is filtered. Residual NVP is 3.2 ppm. The acid-treated polymer is then combined with distilled water (2.8 gal, 11 L), and aqueous sodium hydroxide solution (24.9 g of 20% aq. NaOH) is added to raise the mixture pH to 5.6. The product is vacuum filtered and dried as previously described. Residual NVP: <1 ppm; residual Na: 420 ppm. Total aqueous waste: 5.6 gal (20 L/kg).

This example demonstrates the difficulty in achieving the target specification for Na (<250 ppm) when starting with a high initial concentration of NaOH and then treating with acetic acid (rather than formic acid as in Example 8). The product easily meets the NVP specification, but because a relatively large amount of NaOH is needed for the neutralization step, the product has high residual sodium.

Table 2 summarizes the results from Example 8 and Comparative Example 9.

TABLE 1

Effect of Acid pH and Treatment Temperature on Residual NVP

| Ex # | [NaOH]$_i$ (wt. %) | P$_i$ (psig) | NVP (wt. %) | Acid | to pH | Temp (° C.) | Direct neutralization? | NVP, ppm | Na, ppm | Waste vol. (L/kg) | Footnote |
|---|---|---|---|---|---|---|---|---|---|---|---|
| 1 | 0.20 | 51 | 3.5 | acetic | <4 | 90 | no | 1.7 | 140 | 20 | 1 |
| 2 | 0.20 | 51 | 3.5 | acetic | <4 | 90 | no | 1.5 | | 20 | 2 |
| C3 | 0.57 | 35 | 0.90 | H$_3$PO$_4$ | <4 | 25 | no | 3 | | 35 | 3 |
| C4 | 0.20 | 51 | 3.6 | acetic | <5 | 90 | no | 275 | | 20 | 4 |
| C5 | 0.57 | 35 | 0.78 | acetic | <5 | 90 | no | 77 | | 20 | 4 |
| C6 | 0.57 | 35 | 0.78 | acetic | <4 | 25 | no | 202 | | 22 | 5, 6 |
| C7 | 0.57 | 35 | 1.0 | acetic | <4 | 70 | no | 73 | | 20 | 5 |

[1]Product within specifications.
[2]Acid-treated for 2 h at 90° C.
[3]Conventional approach; excessive waste volume.
[4]High NVP (>5 ppm); need pH <4.
[5]High NVP; need higher temp. for acid treatment.
[6]Water-washed only; no NaOH neutralization step.
C3–C7 = comparative examples.

TABLE 2

Effect of Using Formic Acid with High Initial NaOH Concentration

| Ex # | [NaOH]$_i$ (wt. %) | P$_i$ (psig) | NVP (wt. %) | Acid | to pH | Temp (° C.) | Direct neutralization? | NVP, ppm | Na, ppm | Waste vol. (L/kg) | Footnote |
|---|---|---|---|---|---|---|---|---|---|---|---|
| 8 | 0.57 | 35 | 0.90 | formic | <4 | 90 | no | 1.2 | 89 | 20 | 1 |
| C9 | 0.57 | 35 | 0.78 | acetic | <4 | 90 | no | <1 | 420 | 20 | 2 |

[1]Product within specifications.
[2]High Na content (>250 ppm).
C9 is a comparative example.

TABLE 3

Effect of Direct Neutralization: Reduced Waste but High Na Unless Water Washed

| Ex # | [NaOH]$_i$ (wt. %) | P$_i$ (psig) | NVP (wt. %) | Acid | to pH | Temp (° C.) | Direct neutralization? | Water wash? | NVP, ppm | Na, ppm | Waste vol. (L/kg) | Footnote |
|---|---|---|---|---|---|---|---|---|---|---|---|---|
| 10  | 0.57 | 35 | 0.81 | formic | <4 | 90 | yes | yes | 1.8 | 160  | 20  | 1 |
| C11 | 0.57 | 35 | 0.81 | formic | <4 | 90 | yes | no  | 7.3 | 1200 | 10  | 2 |
| C12 | 0.20 | 55 | 0.77 | formic | <4 | 90 | yes | no  | 1.3 | 730  | 8.2 | 2 |
| C13 | 0.20 | 55 | 0.77 | acetic | <4 | 90 | yes | no  | 8.7 | 1600 | 8.2 | 2 |
| C14 | 0.57 | 35 | 0.78 | acetic | <4 | 90 | yes | no  | 0.4 | 310  | 10  | 2 |

$^1$Product within specifications;
$^2$High Na content.
C11–C14 are comparative examples.

EXAMPLE 10

Direct Neutralization followed by Water Wash

Crosslinked PVP is prepared as in Comparative Example 3. Residual NVP in the polymer is 0.81 wt. %. The polymer is slurried in distilled water (2.8 gal, 11 L), and the mixture is heated to 90° C. Formic acid (13 g) is added to pH<4, and heating continues for 3 h. The slurry is not filtered. Instead, 20% aqueous sodium hydroxide solution (29.5 g) is added directly to the acidic slurry to raise the mixture pH to 5.6. The product is vacuum filtered and washed with distilled water (2.8 gal, 11 L), then dried as previously described. Residual NVP: 1.8 ppm; residual Na: 160 ppm. Total aqueous waste: 5.6 gal (20 L/kg).

This example demonstrates that acceptable PVP-P can be produced with reduced aqueous waste volume by directly neutralizing the acid-treated mixture with aqueous base, provided that a final water wash step to remove Na is included.

Comparative Example 11

Direct Neutralization, No Water Wash

The procedure of Example 10 is followed, except that the final water wash step is omitted. Following neutralization with aq. NaOH, the PVP-P product is vacuum filtered and dried as usual. Residual NVP: 7.3 ppm; residual Na: 1200 ppm. Total aqueous waste: 2.8 gal (10 L/kg).

This example demonstrates the need for a final water wash to eliminate sodium when direct neutralization is used.

Comparative Example 12

Direct Neutralization; No Water Wash

Crosslinked PVP is prepared generally as described in Example 1, but with initial added pressure of 55 psig. Residual NVP is 0.77 wt %. The polymer (254 g) is slurried in distilled water (2.1 L), and the mixture is heated to 90° C. Formic acid (1.7 g) is added to pH<4, and heating continues for 3 h. The slurry is not filtered. Instead, 20% aqueous sodium hydroxide solution (4.73 g) is added directly to the acidic slurry to raise the mixture pH to 5.5. The product is vacuum filtered, then dried as previously described. Residual NVP: 1.3 ppm; residual Na: 730 ppm. Total aqueous waste: 2.1 L (8.2 L/kg).

This example demonstrates the need for a final water wash to eliminate sodium when direct neutralization is used.

Comparative Example 13

Direct Neutralization; No Water Wash

Crosslinked PVP is prepared generally as described in Example 1, but with initial added pressure of 55 psig. Residual NVP is 0.77 wt %. The polymer (254 g) is slurried in distilled water (2.1 L), and the mixture is heated to 90° C. Acetic acid (4.8 g) is added to pH<4, and heating continues for 3 h. The slurry is not filtered. Instead, 20% aqueous sodium hydroxide solution (12.8 g) is added directly to the acidic slurry to raise the mixture pH to 5.7. The product is vacuum filtered, then dried as previously described. Residual NVP: 8.7 ppm; residual Na: 1600 ppm. Total aqueous waste: 2.1 L (8.2 L/kg).

This example demonstrates the need for a final water wash to eliminate Na when direct neutralization is used.

Comparative Example 14

Direct Neutralization, No Water Wash

Crosslinked PVP is prepared generally as described in Comparative Example 3. Residual NVP is 0.78 wt %. The polymer (about 1300 g) is slurried in distilled water (2.8 gal, 11 L), and the mixture is heated to 90° C. Glacial acetic acid (47 g) is added to pH<4, and heating continues for 3 h. The slurry is not filtered. Instead, 20% aqueous sodium hydroxide solution (26 g) is added directly to the acidic slurry to raise the mixture pH to 5.5. The product is vacuum filtered, then dried as previously described. Residual NVP: 0.4 ppm; residual Na: 310 ppm. Total aqueous waste: 2.8 gal (10 L/kg).

This example demonstrates the need for a final water wash to eliminate sodium when direct neutralization is used.

Table 3 summarizes the results from Example 10 and Comparative Examples 11–14.

The preceding examples are meant only as illustrations. The following claims define the invention.

We claim:

1. A process which comprises:
   (a) heating an aqueous mixture that contains from about 70 to about 90 wt. % of N-vinylpyrrolidone and an alkali metal hydroxide in a sealed reactor under added pressure to a temperature within the range of about 130° C. to about 150° C. to generate a crosslinker;
   (b) reducing the reactor temperature to a value within the range of about 95° C. to about 105° C. to initiate polymerization and produce a mixture containing crosslinked polyvinylpyrrolidone (PVP-P) and up to about 4 wt. % of residual N-vinylpyrrolidone;
   (c) adding water and heating the resulting aqueous PVP-P mixture in the presence of a protic acid at a mixture pH less than about 4 and at a temperature within the range of about 80° C. to about 100° C.; and
   (d) neutralizing the PVP-P with aqueous alkali metal hydroxide;

wherein the volume of aqueous waste generated from the process is less than or equal to about 20 L/kg of PVP-P produced, wherein the resulting purified PVP-P has residual N-vinylpyrrolidone less than 5 ppm and residual alkali metal content less than 250 ppm; and wherein none of the aqueous waste generated from the process has a residual NVP concentration greater than about 10 ppm.

2. The process of claim 1 wherein step (a) is performed with less than about 1.0 mole percent, based on the amount of N-vinylpyrrolidone, of alkali metal hydroxide, and the initial reactor pressure in step (a) is at least about 40 psig.

3. The process of claim 2 wherein the protic acid used in step (c) is selected from the group consisting of acetic acid and formic acid.

4. The process of claim 2 wherein the aqueous PVP-P mixture from step (c) is filtered prior to neutralization step (d).

5. The process of claim 2 wherein the volume of aqueous waste generated is less than or equal to about 15 L/kg of PVP-P produced.

6. The process of claim 1 wherein none of the aqueous waste generated from the process has a residual NVP concentration greater than about 5 ppm.

7. The process of claim 1 wherein step (a) is performed with at least about 1.0 mole percent, based on the amount of N-vinylpyrrolidone, of alkali metal hydroxide, the initial reactor pressure in step (a) is less than about 40 psig, and the protic acid used in step (c) is formic acid.

8. The process of claim 7 wherein the aqueous PVP-P mixture from step (c) is filtered prior to neutralization step (d).

9. The process of claim 7 wherein the volume of aqueous waste generated is less than or equal to about 15 L/kg of PVP-P produced.

10. The process of claim 7 wherein none of the aqueous waste generated from the process has a residual NVP concentration greater than about 5 ppm.

11. The process of claim 1 wherein neutralization step (d) is performed by adding the aqueous alkali metal hydroxide directly to the aqueous PVP-P mixture from step (c).

12. The process of claim 11 wherein the neutralized PVP-P from step (d) is isolated by filtration and is then washed with water.

13. The process of claim 11 wherein the volume of aqueous waste generated is less than or equal to about 15 L/kg of PVP-P produced.

14. The process of claim 11 wherein none of the aqueous waste generated from the process has a residual NVP concentration greater than about 5 ppm.

* * * * *